(12) United States Patent
Uchida et al.

(10) Patent No.: US 7,706,099 B2
(45) Date of Patent: Apr. 27, 2010

(54) MAGNETIC DISK DRIVE AND METHOD OF CONTROLLING THE SAME

(75) Inventors: Hiroshi Uchida, Kanagawa (JP); Gaku Ikedo, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 6 days.

(21) Appl. No.: 12/152,756

(22) Filed: May 16, 2008

(65) Prior Publication Data

US 2008/0285170 A1    Nov. 20, 2008

(30) Foreign Application Priority Data

May 18, 2007    (JP)    ............... 2007-132834

(51) Int. Cl.
*G11B 5/596*    (2006.01)
*G11B 21/02*    (2006.01)
(52) U.S. Cl. ...................... 360/77.02; 360/75
(58) Field of Classification Search ........... None
See application file for complete search history.

(56) References Cited

U.S. PATENT DOCUMENTS

| | | | |
|---|---|---|---|
| 6,496,320 B1 * | 12/2002 | Liu | ............... 360/75 |
| 6,597,532 B1 | 7/2003 | Usui et al. | |
| 6,853,512 B2 | 2/2005 | Ozawa | |
| 7,145,746 B1 * | 12/2006 | Hirano et al. | ............ 360/77.04 |
| 7,268,968 B2 * | 9/2007 | Semba et al. | ............ 360/77.02 |
| 7,345,841 B2 * | 3/2008 | Baugh et al. | ............ 360/75 |
| 7,561,365 B2 * | 7/2009 | Noguchi et al. | ............ 360/75 |

FOREIGN PATENT DOCUMENTS

JP    10-199168 A    7/1998

* cited by examiner

*Primary Examiner*—K. Wong
(74) *Attorney, Agent, or Firm*—Townsend and Townsend and Crew LLP; Patrick Duncan (57) ABSTRACT

Embodiments of the present invention provide a magnetic disk drive, in which a disturbance component contained in an output signal from a rotational vibration detector, can be appropriately suppressed irrespective of frequency of the component, and a method of controlling the drive. According to one embodiment, in a magnetic disk drive having a rotational vibration detector for detecting rotational vibration of a drive housing, a main control circuit performs a head moving step of driving a voice coil motor to move a magnetic head on a magnetic disk, a frequency estimation step of estimating a frequency of each disturbance component contained in an output signal from the rotational vibration detector after moving the magnetic head, and a suppressor setting step of setting a notch filter for suppressing the disturbance component based on the estimated frequency.

14 Claims, 10 Drawing Sheets

MAGNETIC DISK DRIVE AND METHOD OF CONTROLLING THE SAME

CROSS-REFERENCE TO RELATED APPLICATION

The instant nonprovisional patent application claims priority to Japanese Patent Application No. 2007-132834 filed May 18, 2007 and which is incorporated by reference in its entirety herein for all purposes.

BACKGROUND OF THE INVENTION

In a magnetic disk drive such as hard disk drive, when rotational vibration is applied to a disk housing due to a shock from the outside, disturbance caused by such rotational vibration may act on a positioning control system of a magnetic head, which possibly interferes with positioning of the magnetic head. Therefore the magnetic disk drive has been applied with a measure for compensating the disturbance caused by the rotational vibration of the disk housing.

For example, Japanese Patent Publication No. 2001-14782 ("patent document 1") discloses a magnetic disk drive in which a rotational vibration detector for detecting rotational vibration of a drive housing is provided, and a feed-forward control system for outputting a signal for compensating disturbance according to detected rotational vibration is incorporated in the positioning control system of the magnetic head.

When the rotational vibration detector is provided in the magnetic disk drive, an output signal from the rotational vibration detector may contain a disturbance component due to mechanical resonance of the rotational vibration detector (hereinafter, called resonance disturbance component). Therefore, the resonance disturbance component needs to be suppressed.

However, since mechanical resonance frequency of the rotational vibration detector is different depending on production lots, the resonance disturbance component contained in the output signal from the rotational vibration detector is hard to be suppressed. For example, when a filter (so-called notch filter) is used for suppressing a signal component in a specific frequency band, a frequency of the resonance disturbance component is possibly deviated from the specific frequency band of the filter, and consequently the resonance disturbance component may be hardly suppressed. Moreover, when the specific frequency band of the notch filter is widened in order to suppress the resonance disturbance even if there is the variation in mechanical resonance frequency, phase delay in the output signal possibly becomes too large to enhance the disturbance compensation by the feed-forward control system.

BRIEF SUMMARY OF THE INVENTION

Embodiments of the present invention provide a magnetic disk drive, in which a disturbance component contained in an output signal from a rotational vibration detector, can be appropriately suppressed irrespective of frequency of the component, and a method of controlling the drive. According to the particular embodiment of FIG. 1, in a magnetic disk drive 1 having a rotational vibration detector 30 for detecting rotational vibration of a drive housing, a main control circuit 10 performs a head moving step of driving a voice coil motor to move a magnetic head on a magnetic disk, a frequency estimation step of estimating a frequency of each disturbance component contained in an output signal from the rotational vibration detector 30 after moving the magnetic head, and a suppressor setting step of setting a notch filter for suppressing the disturbance component based on the estimated frequency.

DETAILED DESCRIPTION OF THE INVENTION

Embodiments of the present invention relate to a magnetic disk drive having a rotational vibration detector for detecting rotational vibration of a drive housing, and a method of controlling the drive.

An object of embodiments of the invention is to provide a magnetic disk drive in which the disturbance component contained in the output signal from the rotational vibration detector can be appropriately suppressed irrespective of frequency of the component, and to provide a method of controlling the drive.

To solve the problem, a method of controlling a magnetic disk drive of embodiments of the invention is characterized in that aiming at a magnetic disk drive having a magnetic disk, a magnetic head, a support mechanism that supports the magnetic head on the magnetic disk, and is rotatable about a rotation axis fixed outside the magnetic disk, a head actuator that rotatably drives the support mechanism to move the magnetic head in an approximately radial direction of the magnetic disk, and a rotational vibration detector that detects rotational vibration of a drive housing about the rotation axis, wherein an output signal from the rotational vibration detector is used for controlling the head actuator; the method includes a head moving step of driving the head actuator to move the magnetic head on the magnetic disk, a frequency estimation step of estimating a frequency of each disturbance component contained in the output signal from the rotational vibration detector after moving the magnetic head, and a suppressor setting step of setting a disturbance suppressor for suppressing the disturbance component based on the estimated frequency.

According to an aspect of embodiments of the invention, the disturbance suppressor is configured by a digital filter, and the suppressor setting step includes setting a parameter included in a transfer function of the digital filter according to the estimated frequency.

In the aspect, the parameter is determined for each frequency such that the digital filter suppresses a signal component in a predetermined frequency band including the relevant frequency.

According to another aspect of embodiments of the invention, the frequency estimation step includes changing a mode between a mode where an estimated value is approximated to a frequency of a relatively large disturbance component in the disturbance components contained in the output signal from the rotational vibration detector, and a mode where the estimated value is allowed to match with the relevant frequency of the large disturbance component.

According to still another aspect of embodiments of the invention, the head moving step is repeated until the frequency of the disturbance component is estimated in the frequency estimation step.

According to still another aspect of embodiments of the invention, when the output signal from the rotational vibration detector contains a plurality of disturbance components being different in frequency, aiming at the output signal from the rotational vibration detector, the head moving step, the frequency estimation step, and the suppressor setting step are performed, so that a first disturbance suppressor is set so as to suppress a first disturbance component, and then aiming at an output signal from the first disturbance suppressor, the head moving step, the frequency estimation step, and the suppressor setting step are performed, so that a second disturbance suppressor is set so as to suppress a second disturbance component.

According to still another aspect of embodiments of the invention, the rotational vibration detector is installed on the device housing, or on a substrate attached to the device housing.

A magnetic disk drive of embodiments of the invention includes a magnetic disk, a magnetic head, a support mechanism that supports the magnetic head on the magnetic disk, and is rotatable about a rotation axis fixed outside the magnetic disk, a head actuator that rotatably drives the support mechanism to move the magnetic head in an approximately radial direction of the magnetic disk, a rotational vibration detector that detects rotational vibration of a drive housing about the rotation axis, head moving means for driving the head actuator to move the magnetic head on the magnetic disk, frequency estimation means for estimating a frequency of each disturbance component contained in an output signal from the rotational vibration detector after moving the magnetic head, and suppressor setting means for setting a disturbance suppressor for suppressing the disturbance component based on the estimated frequency; wherein an output signal from the disturbance suppressor is used for controlling the head actuator.

It has been found that a resonance disturbance component contained in an output signal from the rotational vibration detector was hardly attenuated, and when the head actuator was driven to move the magnetic head, the resonance disturbance component was remained for a certain period in the output signal from the rotational vibration detector after moving the magnetic head. Thus, in embodiments of the invention, a disturbance suppressor is set, which moves the magnetic head so as to estimate a frequency of the resonance disturbance component contained in the output signal from the rotational vibration detector after moving the magnetic head, and suppresses the resonance disturbance component based on the estimated frequency. Thus, the resonance disturbance component contained in the output signal from the rotational vibration detector can be appropriately suppressed irrespective of frequency of the component.

Particular embodiments of the invention will be described with reference to drawings.

Figure 1:
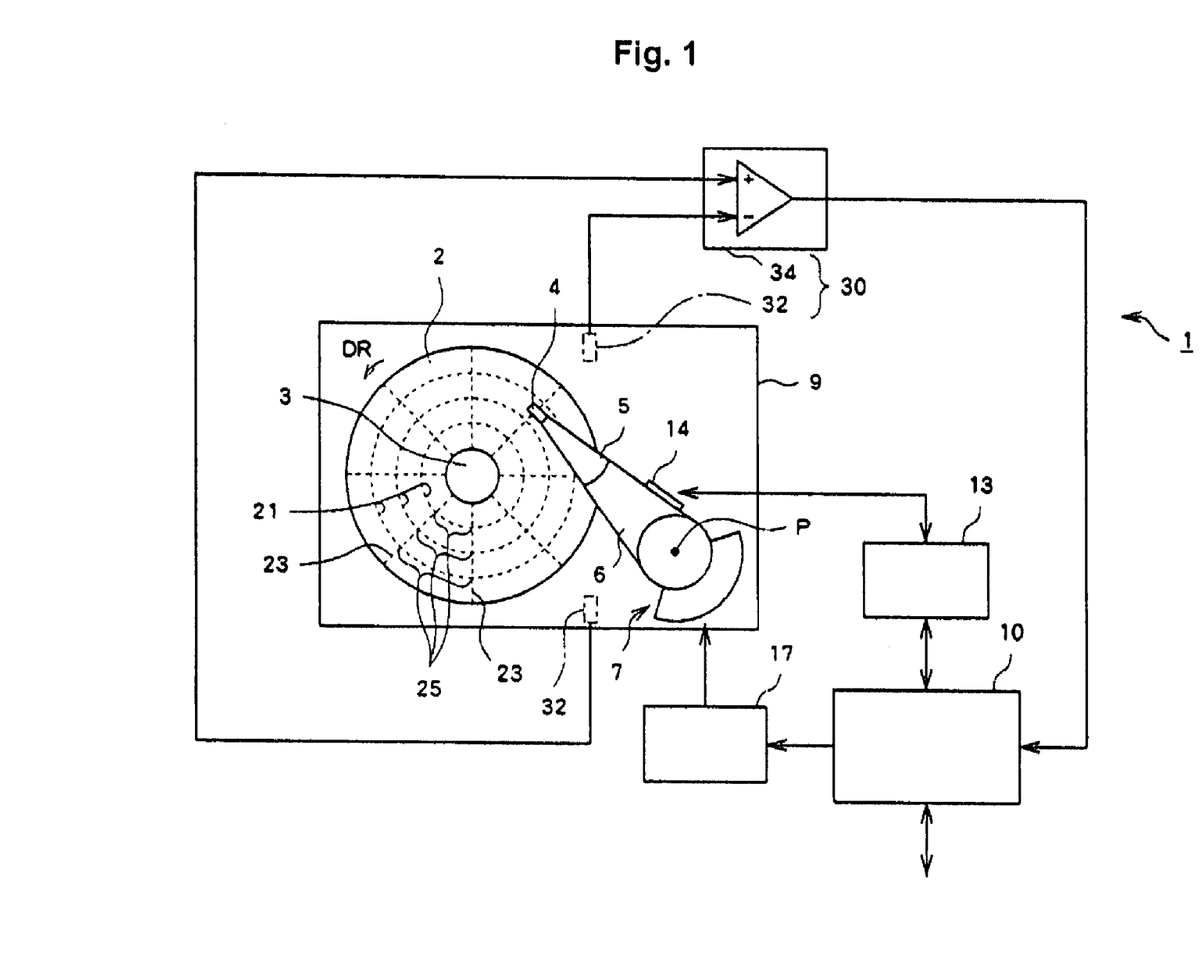
FIG. 1 shows a block diagram showing a configuration example of a magnetic disk drive according to an embodiment of the invention.

FIG. 1 shows a configuration example of a magnetic disk drive according to an embodiment of the invention. A magnetic disk drive 1 accommodates in a housing 9 a magnetic disk 2, spindle motor 3, magnetic head 4, suspension arm 5, carriage 6, voice coil motor 7, and head amplifier 14.

Moreover, the magnetic disk drive 1 has a main control circuit 10, read/write channel (R/W channel) 13, and a motor driver 17 on a substrate attached to the housing 9. The main control circuit 10 includes a microprocessing unit (MPU) and a hard disk controller (HDC).

Moreover, the magnetic disk drive 1 has a rotational vibration detector 30 on the substrate attached to the housing 9. The rotational vibration detector 30 is configured by a plurality of acceleration sensors 32 and a circuit section 34. The plurality of acceleration sensors 32 may be directly attached to the housing 9.

The magnetic disk 2 is mounted on the spindle motor 3, and rotationally driven in a direction of an arrow DR in the figure. A plurality of tracks 21 being concentrically arranged are formed on the magnetic disk 2. A servo data area 23 is provided in each track 21 in a certain period along a circumferential direction. An area between respective servo data areas 23 is made as a user data area 25.

The magnetic head 4 includes a read element and a write element, and is mounted on a tip of the suspension arm 5 and supported on the magnetic disk 2. The suspension arm 5 is attached to the carriage 6 being integrated with a part of the voice coil motor 7. The suspension arm 5 and the carriage 6 form a support mechanism of the magnetic head 4, and are rotatably provided about a rotation axis P fixed outside the magnetic disk 2. The voice coil motor 7, which is an example of a head actuator, rotationally drives the carriage 6 to move the magnetic head 4 supported on the lip of the suspension arm 5 in an approximately radial direction on the magnetic disk 2.

The rotational vibration detector 30 detects rotational vibration of the housing 9 about the rotation axis P, and outputs a signal indicating the rotational vibration to a main control circuit 10. The plurality of acceleration sensors 32 are set on the substrate attached to the housing 9 respectively, for example, at positions distanced from one another as shown in FIG. 1. the acceleration sensors 32 are set such that when each sensor detects acceleration in the same direction, the sensor outputs the same signal. The circuit section 34, for example, includes a differential amplifier circuit, and amplifies difference in output from respective acceleration sensors 32 and outputs the amplified difference. In this way, when difference is found in output from the plurality of acceleration sensors 32, the circuit section 34 outputs a signal, thereby rotational vibration of the housing 9 can be detected.

The MPU included in the main control circuit 10, which performs control of the overall drive, reads a program stored in a not-shown memory and executes the program in order to achieve various kinds of control, such as positioning control of the magnetic head 4 or control of recording/reproducing of data. In the embodiment, the MPU functions to move the head, to estimate the frequency, and to set the suppressor. Such functions are described in detail later.

In the positioning control of the magnetic head 4, the MPU specifies a current position of the magnetic head 4 based on servo data inputted from the R/W channel 13, and generates an error signal (PES: Position Error Signal) indicating an error between a target position of the magnetic head 4 and the current position thereof. Then, the MPU generates a control signal for driving the voice coil motor 7 based on the PES, and outputs the control signal to the motor driver 17. Thus, the magnetic head 4 is sought to a point on a track at the target position, and positioned at the point.

The HDC included in the main control circuit 10 has an interface controller, an error correction circuit, a buffer controller and the like. When the HDC receives user data to be recorded in the magnetic disk 2 from an external host, the HDC outputs the user data to the R/W channel 13. Moreover, when the HDC is inputted with user data reproduced from the magnetic disk 2 from the R/W channel 13, the HDC transmits the user data to the external host. At that time, the HDC temporarily stores the user data in a not-shown buffer memory according to control of the MPU.

When the R/W channel 13 is inputted with the user data from the main control circuit 10, the channel 13 modulates the user data and outputs the data to the head amplifier 14. Moreover, when the R/W channel 13 is inputted with a reproducing signal, which was reproduced from the magnetic disk 2 by the magnetic head 4, from the head amplifier 14, the channel 13 converts the reproducing signal into digital data, then demodulates the data, and then outputs the demodulated data to the main control circuit 10. Moreover, the R/W channel 13 extracts servo data from the reproducing signal in a certain sampling period, and outputs the servo data to the main control circuit 10.

When the head amplifier 14 is inputted with data to be recorded into the magnetic disk 2 from the R/W channel 13, the head amplifier converts the data into a recording signal and outputs the signal to the magnetic head 4. Moreover, when the head amplifier 14 is inputted from the magnetic head 4 with a reproducing signal read from the magnetic disk 2, the head amplifier amplifies the reproducing signal, and outputs the signal to the R/W channel 13.

When the motor driver 17 is inputted with a control signal for the voice coil motor 7 from the main control circuit 10, the motor driver performs analog conversion to the control signal, then amplifies the converted signal, and then outputs the signal to the voice coil motor 7. Moreover, when the motor driver 17 is inputted with a control signal for the spindle motor 3 from the main control circuit 10, the motor driver performs analog conversion to the control signal, then amplifies the converted signal, and then outputs the signal to the spindle motor 7.

Figure 2:
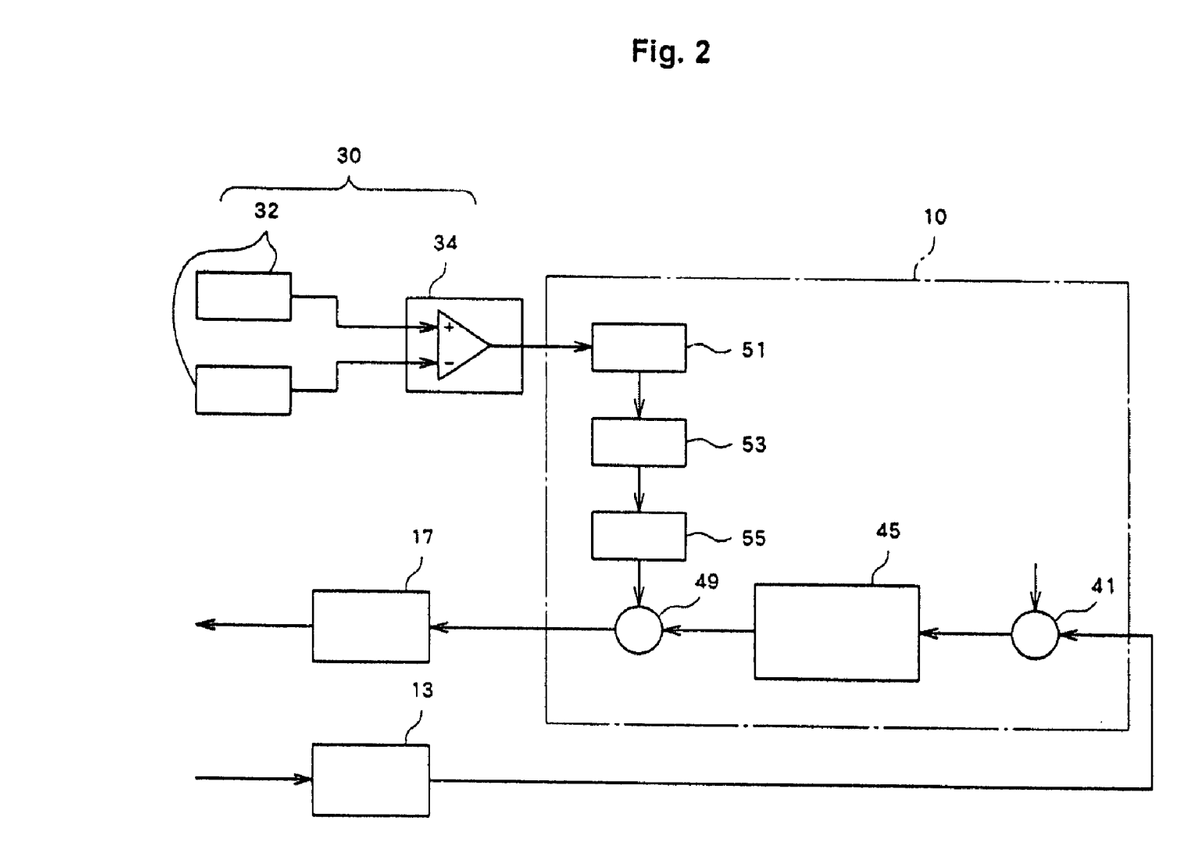
FIG. 2 shows a block diagram showing an operational configuration example of a main control circuit during normal operation.

FIG. 2 shows an operational configuration example during normal operation of the main control circuit 10. During normal operation, the main control circuit 10 functionally has an error signal generator 41, a controller 45, an adder 49, a notch filter (disturbance suppressor) 53, and a rotational vibration compensator 55. Moreover, the main control circuit 10 has an analog-to-digital converted (AD converter) 51.

The error signal generator 41 generates an error signal (PES) showing a positional error between a current position of the magnetic head 4 specified by the servo data inputted from the R/W channel 13, and a target position of the magnetic head 4 determined according to a recording instruction or a reproducing instruction from an external device, and outputs the error signal to the controller 45.

The controller 45 generates a control signal for driving the voice coil motor 7 based on the PES inputted from the error signal generator 41, and outputs the control signal to the adder 49. The control signal is generated to suppress the positional error of the magnetic head 4 so as to stabilize the whole control system.

The AD converter 51 performs analog-to-digital conversion to the output signal from the rotational vibration detector 30, and outputs the converted signal to the notch filter 53.

The notch filter 53 is provided to suppress a resonance disturbance component contained in an output signal from the rotational vibration detector 30 (disturbance component due to mechanical resonance of the rotational vibration detector 30). The notch filter 53 suppresses a signal component in a specific frequency band (frequency band in which suppression is effectively performed) among components of the output signal from the rotational vibration detector 30. The frequency notch filter 53 is to be set with the specific frequency band according to a configuration and operation as described later.

The rotational vibration compensator 55 generates a compensation signal for compensating disturbance caused by rotational vibration applied to the housing 9, which acts on a feedback control system including the controller 45, based on the output signal from the rotational vibration detector 30 in which the signal component in the specific frequency band is suppressed by the notch filter 53, and outputs the compensation signal to the adder 49.

The adder 49 adds the control signal outputted from the controller 45, and the compensation signal outputted from the rotational vibration compensator 55, and outputs the added signal to the motor driver 17 so as to drive the voice coil motor 7.

Figure 3:
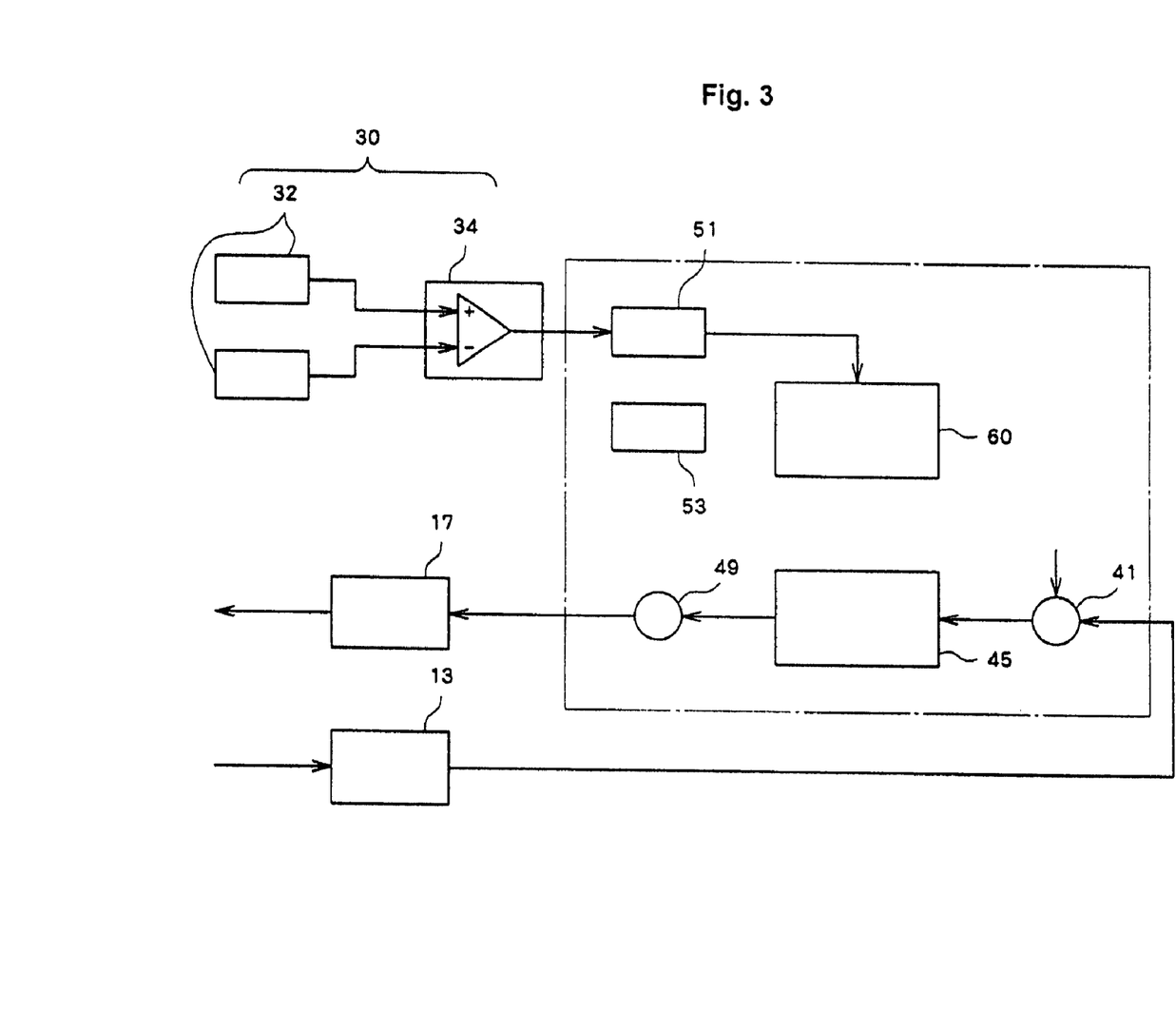
FIG. 3 shows a block diagram showing an operational configuration example of the main control circuit during filter setting.

FIG. 3 shows an operational configuration example during filter setting of the main control circuit 10. The operational configuration is established for setting the notch filter 53. During filter setting, the main control circuit 10 functionally has a frequency estimation block 60 in addition to the controller 45 and the like.

Figure 4:
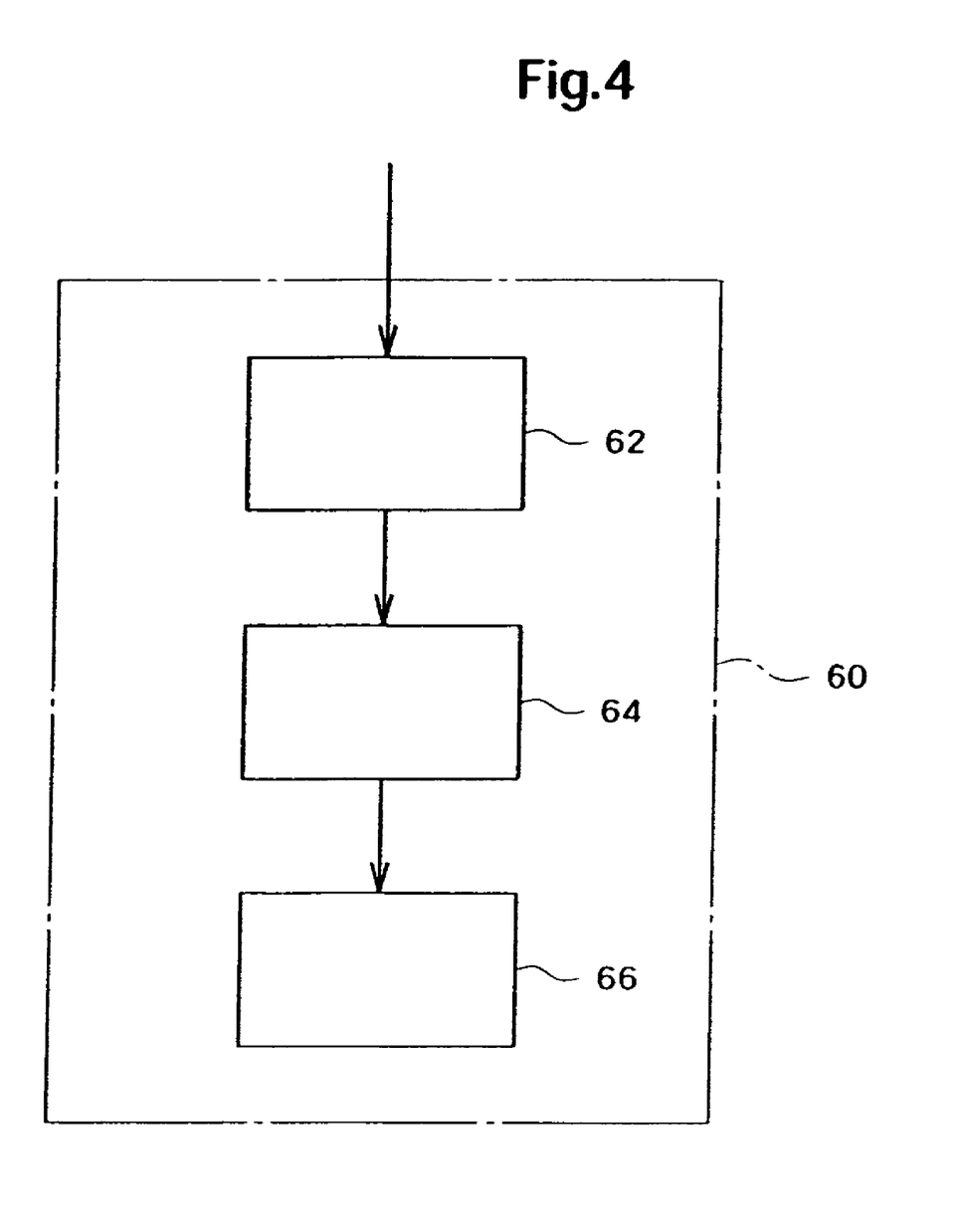
FIG. 4 shows a block diagram showing an operational configuration example of a frequency estimation block in FIG. 3.

The frequency estimation block 60 has a function of estimating a frequency of the resonance disturbance component contained in the output signal from the rotational vibration detector 30. Specifically, the frequency estimation block 60 functionally has a band-pass filter 62, frequency estimation section 64, and convergence test section 66, as shown in FIG. 4.

The band-pass filter 62 suppresses signal components in low and high frequency ranges among components of the output signal from the rotational vibration detector 30 inputted from the AD converter 51, and then outputs the signal to the frequency estimation section 64. Thus, only a frequency range is cut out, in which the resonance disturbance component is considered to appear in the output signal from the rotational vibration detector 30.

Operation of each of the frequency estimation section 64 and the convergence test section 66 is described in detail later.

Figure 5:
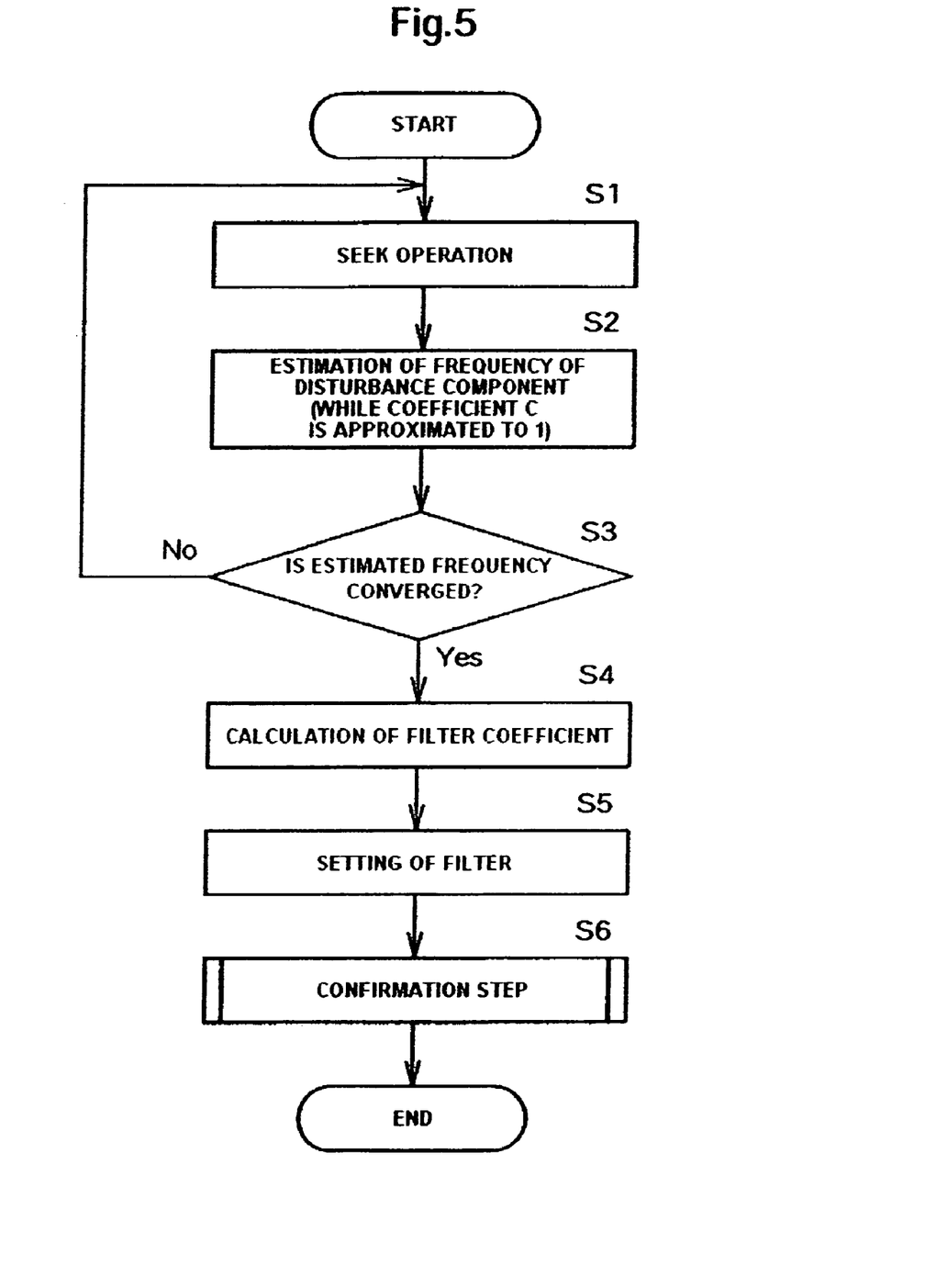
FIG. 5 shows a flowchart showing an operation example of the main control circuit during filter setting.

FIG. 5 shows an operation example during filter setting of the main control circuit 10.

Step S1 is a head moving step. The main control circuit 10 permits seek operation that the voice coil motor 7 is driven to move the magnetic head 4 by a certain distance. The housing 9 is applied with rotational vibration about the rotation axis P due to the seek operation. A moving distance of the magnetic head 4 can be set to be about a distance at which adequate rotational vibration can be applied to the housing 9. For example, the distance can be set to be about a distance corresponding to radius of the magnetic disk 2.

Figure 6:
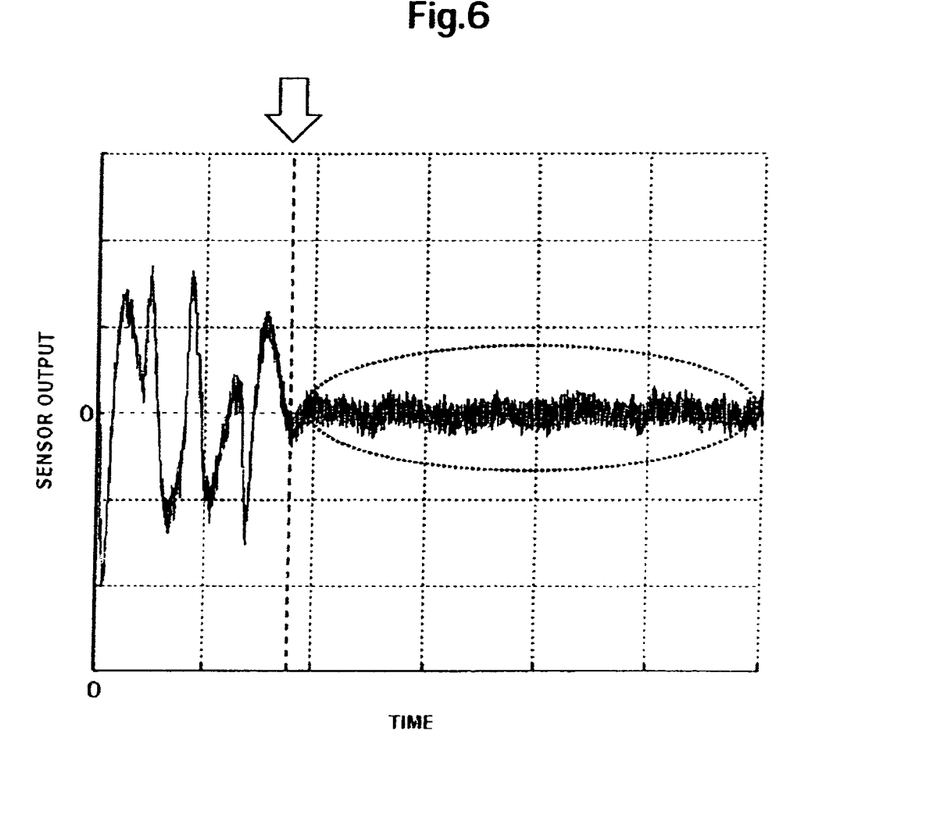
FIG. 6 shows a graph showing an output signal from a rotational vibration detector during and after seek operation of a magnetic head.

FIG. 6 shows a graph of the output signal from the rotational vibration detector 30 during and after the seek operation of the magnetic head 4. An arrow in FIG. 6 shows an end point of the seek operation. From FIG. 6, it is known that some vibration component is remained in the output signal from the rotational vibration detector 30 without being attenuated after the seek operation (an area enclosed by a broken line in FIG. 6).

Figure 7A:
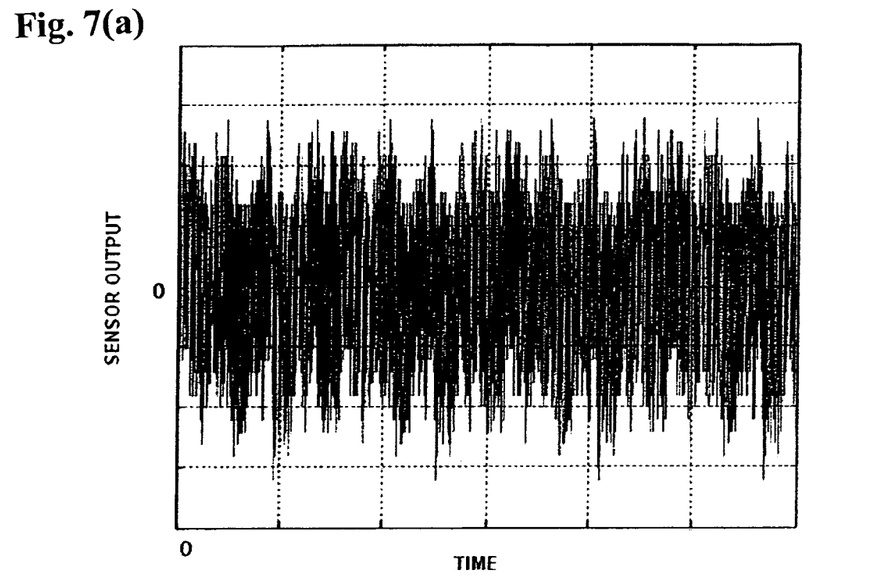
FIG. 7(A) shows a graph showing a relevant part of the graph of FIG. 6 in an enlarged manner.
Figure 7B:
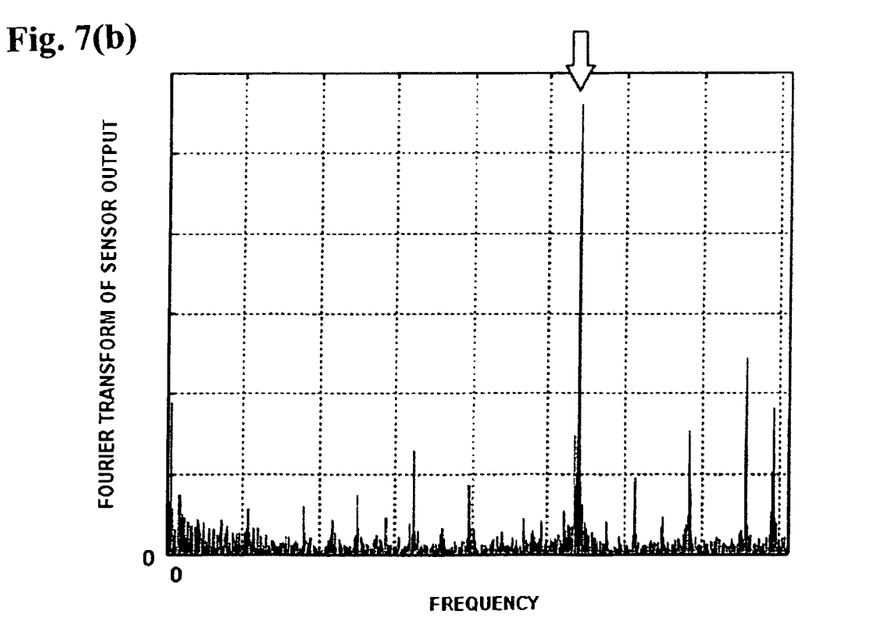
FIG. 7(B) shows a graph showing Fourier transform of that graph.

FIG. 7(A) shows a graph showing the area enclosed by a broken line in FIG. 6 in an enlarged manner. FIG. 7(B) shows a graph showing the area after being subjected to Fourier transform. As seen from FIG. 7(B), the vibration component remained after seek operation has steep peaks.

Such a vibration component remained after seek operation was confirmed to be a resonance disturbance component (disturbance component due to mechanical resonance of the rotational vibration detector 30). That is, it was confirmed that when seek operation of the magnetic head 4 was carried out, the resonance disturbance component was remained in the output signal from the rotational vibration detector 30 after seek operation Therefore, in order to estimate a frequency of the resonance disturbance component in a step described later, seek operation of the magnetic head 4 is performed so that the resonance disturbance component appears in the output signal from the rotational vibration detector 30 in the step S1.

Steps S2 and S3 in FIG. 5 are frequency estimation steps respectively. The step S2 is based on a function of the frequency estimation section 64. In the step S2, the main control circuit 10 estimates the frequency of the resonance disturbance component appearing in the output signal from the rotational vibration detector 30 after the seek operation of the magnetic head 4.

For estimating the frequency of the resonance disturbance component, a frequency estimation technique using a chasing peak filter can be used as described in Japanese Patent Publication No. 2003-109335 or the like. For example, the main control circuit 10 compares a phase of an output signal from the rotational vibration detector 30 to a phase of an output signal from a chasing peak filter (not shown), and updates a peak frequency of the chasing peak filter based on a result of such comparison so that the peak frequency follows a frequency of a resonance disturbance component. Thus, the frequency of the resonance disturbance component is estimated.

Specifically, estimation of the frequency of the resonance disturbance component can be made by performing calculation according to the following numeral expressions 1 to 5.

$$y(n+2)=x(n)+B(n)\cdot y(n+1)-C\cdot y(n) \qquad \text{Numeral expression 1}$$

The numeral expression 1 expresses a denominator of a chasing peak filter. Since a numerator of the chasing peak filter has no connection with the peak frequency, detailed description of the numerator is omitted.

Variable x represents an output signal from the rotational vibration detector 30. Specifically, x shows a signal inputted from the band-pass filter 62 into the frequency estimation section 64 in the FIG. 4. Variable y represents an output signal from the chasing peak filter.

C is a filter constant. In the embodiment, the C is changed according to the number of times calculation n (described later in detail).

B is a filter constant. The B is a filter constant including a peak frequency, and expressed by the following numeral expression 2. In the chasing peak filter, the peak frequency is specified as an estimated frequency for estimating the resonance disturbance component.

$$B=2\cdot\cos(2\pi\cdot f\cdot T_s) \qquad \text{Numeral expression 2}$$

Variable f represents a peak frequency (estimated frequency). $T_s$ shows sampling time.

$$P(n)=(1-a_1)\cdot P(n-1)+a_1\cdot y(n)\cdot y(n) \qquad \text{Numeral expression 3}$$

The numeral expression 3 shows square mean of y. $a_1$ is a coefficient.

$$B(n+1) = B(n) + a_2 \cdot \frac{x(n-1)\cdot y(n)}{P(n)} \qquad \text{Numeral expression 4}$$

The numeral expression 4 shows a filter constant B including the estimated frequency f. Here, the second term of the right side of the numeral expression 4 is assumed as dB shown in the following numeral expression 5. $a_2$ is a coefficient.

$$dB(n) = a_2 \cdot \frac{x(n-1)\cdot y(n)}{P(n)} \qquad \text{Numeral expression 5}$$

In the embodiment, when the frequency of the resonance disturbance component is estimated, a first mode where the estimated frequency f of the chasing peak filter is approximated to a frequency of a relatively large disturbance component in disturbance components contained in the output signal from the rotational vibration detector 30, and a second mode where the estimated frequency f of the chasing peak filter is converged to the frequency of the relevant large disturbance component area changed from each other according to the number of times of calculation n.

Specifically, when the number of times of calculation n is smaller than a predetermined number, the filter coefficient C included in the numerical expression 1 is set to be a value slightly smaller than 1 as the first mode, and when the number of times of calculation n is not smaller than the predetermined number, the filter coefficient C is set to be 1 as the second mode. The filter coefficient C is set to be 1 in the usual chasing peak filter.

When the filter coefficient C is set to be 1 as in the second mode (as in the usual chasing peak filter), the estimated frequency f of the chasing peak filter can be converged to a frequency of a disturbance component contained in an output signal from the rotational vibration detector 30. However, when a plurality of disturbance components are contained in an output signal from the rotational vibration detector 30. However, when a plurality of disturbance components are contained in an output signal from the rotational vibration detector 30 (the components being not limited to the resonance disturbance component) as shown in FIG. 7(B), the estimated frequency f of the chasing peak filter may be converged to a frequency of a disturbance component having a relatively small peak intensity. This is because gain of the chasing peak filter is infinite at the estimated frequency f, consequently output of the chasing peak filter may be constant in level at the frequency f irrespective of peak intensity of the disturbance component.

On the other hand, when the filter coefficient C is set to be a value smaller than 1 as in the first mode, even if a plurality of disturbance components are contained in the output signal from the rotational vibration detector 30, the estimated frequency f of the chasing peak filter can be approximated to a frequency of a relatively large disturbance component (for example, resonance disturbance component). This is because gain of the chasing peak filter is finite at the estimated frequency f, consequently output of the chasing peak filter is different in level depending on peak intensity of the disturbance component. However, since the filter coefficient C is not 1, the estimated frequency f of the chasing peak filter is approximated to the frequency of the relevant large disturbance component, but is not perfectly converged.

Therefore, in the embodiment, the estimated frequency f of the chasing peak filter is approximated to a frequency of a relatively large disturbance component among disturbance components contained in the output signal from the rotational vibration detector 30 in the first mode, then the estimated frequency f of the chasing peak filter is converged to the frequency of the relevant large disturbance component in the second mode. According to this, even if a plurality of disturbance components are contained in the output signal from the rotational vibration detector 30, the estimated frequency f of the chasing peak filter can be converged to a frequency of a relatively large disturbance component.

In the first mode, the filter coefficient C may be set to be approximated to 1 with increase in number of times of calculation n. According to this, since the estimated frequency f of the chasing peak filter can be further approximated to a frequency of a relatively large disturbance component before the mode is changed to the second mode, the estimated frequency f of the chasing peak filter can be converged to the frequency of the relevant large disturbance component at a higher accuracy after the mode is changed to the second mode.

The step S3 is based on a function of the convergence test section 66. In the step S3, the main control circuit 10 determines based on dB expressed by the numerical expression 5 whether the estimated frequency f of the chasing peak filter is converged to the frequency of the resonance disturbance component contained in the output signal from the rotational vibration detector 30. Specifically, when the number of times of calculation n of the chasing peak filter exceeds a predetermined number, the main control circuit 10 compares an absolute value of dB to a threshold value, and thereby determines whether the estimated frequency f is converged or not.

Here, when the estimated frequency f of the chasing peak filter is not converged to the frequency of the resonance disturbance component contained in the output signal from the rotational vibration detector 30 (S3: NO), the main control circuit 10 returns the processing to the step S1 to perform the seek operation of the magnetic head 4 again, and estimates the frequency of the resonance disturbance component again in the step S2 assuming that a value of the previous estimated frequency f is an initial value. In this way, even if the frequency of the resonance disturbance component cannot be estimated through a single seek operation, the frequency of the resonance disturbance component may be estimated by repeating the steps S1 and S2.

Steps S4 and S5 are suppressor setting steps respectively. In the step S4, the main control circuit 10 calculates a filter coefficient (parameter) included in a transfer function of the notch filter 53 based on the estimated frequency f obtained through the steps S1 to S3. Moreover, in the step S5, the main control circuit 10 sets the calculated filter coefficient to the notch filter 53.

Specifically, the transfer function of the notch filter 53 is expressed by the following numerical expression 6.

$$\frac{Y}{X} = K \cdot \frac{1 - B \cdot z^{-1} + C \cdot z^{-2}}{1 - E \cdot z^{-1} - F \cdot z^{-2}}$$ Numeral expression 6

X shows an input signal into the notch filter 53, namely, an output signal from the rotational vibration detector 30. Y shows an output signal from the notch filter 53.

C shows the same filter coefficient as the filter coefficient C included in the numerical expression 1. Here, the filter coefficient C is set to be 1.

B shows the same filter coefficient as the filter coefficient B expressed by the numerical expression 2, which is responsible for a central frequency (peak frequency) of the specific frequency band (frequency band in which suppression is effectively performed) of the notch filter 53.

K, E and F are filter coefficients respectively, each of which is responsible for characteristics such as width of the specific frequency band of the notch filter 53.

The main control circuit 10 uses the filter coefficient B obtained through the steps S1 to S3 (that is, the filter coefficient B including the estimated frequency f of the chasing peak filter, the estimated frequency being converged to the resonance disturbance component contained in the output signal from the rotational vibration detector 30) as a filter coefficient B of the notch filter 53 as expressed by the numerical expression 6. Thus, since the central frequency of the specific frequency band of the notch filter 53 can be allowed to match with the frequency of the resonance disturbance component contained in the output signal from the rotational vibration detector 30, the resonance disturbance component can be suppressed.

Moreover, the main control circuit 10 obtains other filters coefficients K, E and F according to correspondence relationships being previously determined based on the filter coefficient B obtained through the steps S1 to S3.

Hereinafter, the correspondence relationships between respective filter coefficients are described. The correspondence relationship between the filter coefficient B and each of the filter coefficients K, E and F is previously determined by calculating the correspondence relationship using an external computer or the like.

Specifically, using an external computer or the like, a plurality of notch filters, each having a desired characteristic, are created while a central frequency is changed, and the correspondence relationship between the filter coefficient B, which depends on the central frequency, and each of the filter coefficients K, E and F is derived from the notch filters.

Figure 8A:
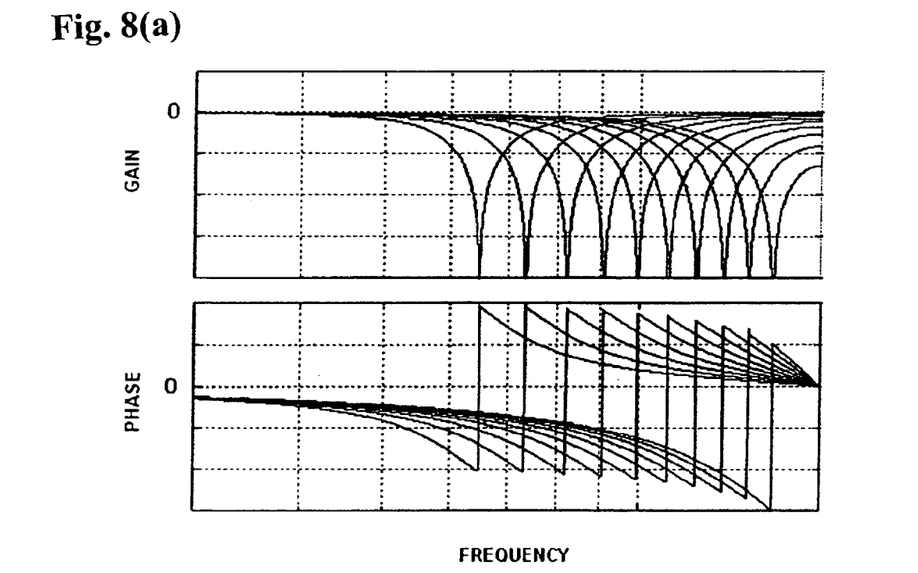
FIGS. 8(A) and 8(B) show explanatory diagrams for driving correspondence relationships between respective filter coefficients.
Figure 8B:
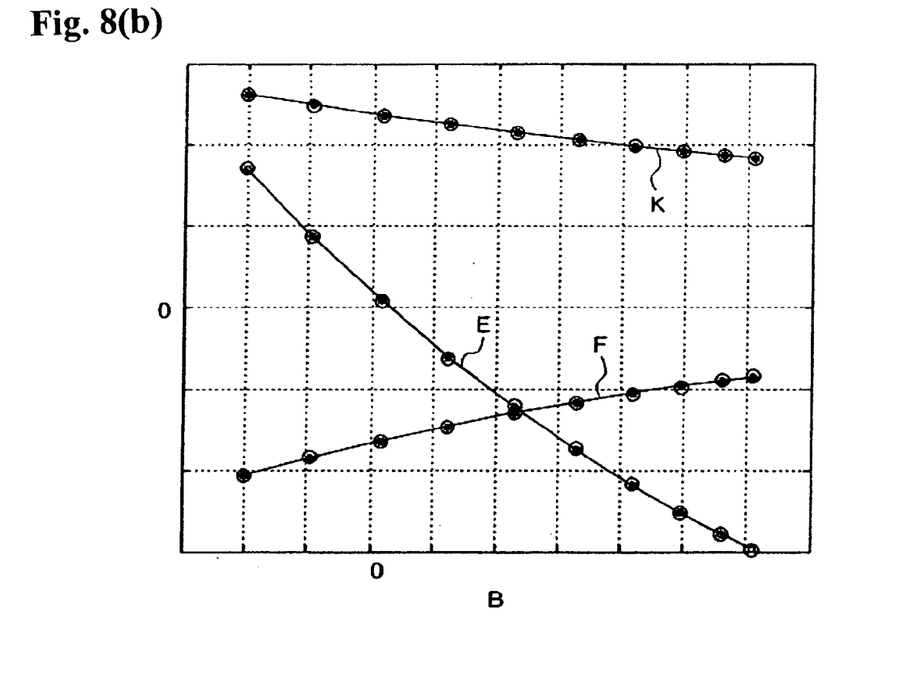

FIG. 8 shows explanatory diagrams for deriving correspondence relationships between the respective filter coefficients.

FIG. 8(A) is a graph showing characteristics of plurality of notch filters having central frequencies different from one another, the notch filters being created using an external computer or the like. An upper view shows gain-to-frequency characteristics, and a lower view shows phase-to-frequency characteristics of output signals to input ones.

Since these notch filters are used in a feed-forward control system for compensating rotational vibration, the filters are created such that they have the same phase-to-frequency characteristic in a low frequency range. Thus, the same characteristic of the feed-forward control system is given in the low frequency range in which rotational vibration is compensated irrespective of a notch filter to be selected.

FIG. 8(B) is a graph showing correspondence relationships between the filter coefficients B, which depend on the central frequency, and other filter coefficients K, E and F of the plurality of notch filters shown in FIG. 8(A).

FIG. 8(B) shows points plotted so as to show the correspondence relationships between the filter coefficients B, which depend on the central frequency, and other filter coefficients K, E and F of the plurality of notch filters shown in FIG. 8(A), and shows function curves obtained by fitting the plotted points.

In the embodiment, the functions showing the correspondence relationships between respective filter coefficients obtained in this way are previously stored in a memory or the like included in the main control circuit 10. It is noted that such functions are not restrictive, and a table or the like may be stored as long as it shows the correspondence relationships between the filter coefficients.

The main control circuit 10 obtains corresponding filter coefficients K, E and F from the filter coefficient B obtained through the steps S1 to S3 based on the stored function, and sets the filter coefficients to the notch filter 53.

Thus, the main control circuit 10 can set a notch filter 53 so as to have a characteristic where width of the specific frequency band is relatively narrow, and then phase delay by the notch filter 53 is reduced.

Moreover, the filter coefficients K, E and F are obtained based on the previously determined correspondence relationships between the respective filter coefficients, thereby the calculation as shown in FIG. 8 needs not be carried out by the main control circuit 10, and consequently setting of the notch filter 53 can be easily performed.

Step S6 in FIG. 5 is a confirmation step. In the confirmation step, the main control circuit 10 confirms whether the notch filter 53 being set with the filter coefficient can suppress the resonance disturbance component contained in the output signal from the rotational vibration detector 30.

Figure 9:
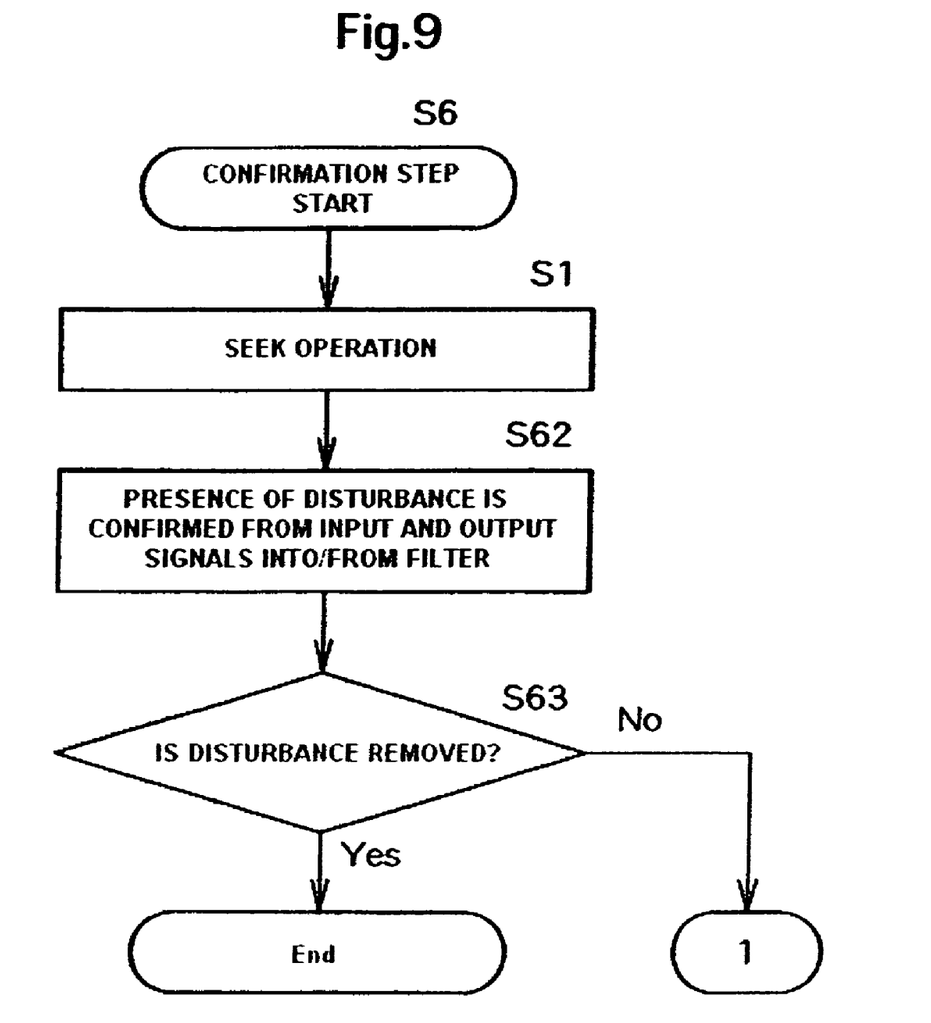
FIG. 9 shows a flowchart showing an operation example of a confirmation step in FIG. 5.

FIG. 9 shows an operation example of the confirmation step. In the following description, steps overlapping with those in the flowchart described before are marked with the same numbers in FIG. 9 respectively, and detailed description of the steps is omitted.

First, the main control circuit 10 permits seek operation of the magnetic head 4 in the head moving step (S1) so that a resonance disturbance component appears in the output signal from the rotational vibration detector 30.

Next, the main control circuit 10 confirms based on input and output signals into/from the notch filter 53 whether the resonance disturbance component contained in the output signal from the rotational vibration detector 30 can be suppressed or not (S62). Such confirmation is performed by calculating square sum of the input signal into the notch filter 53 and square sum of the output signal from the notch filter.

The square sum $P_{in}$ of the input signal into the notch filter 53, and square sum $P_{out}$ of the output signal from the notch filter 53 are expressed as the following numeral expressions 7 and 8 respectively.

$$P_{in} = \sum_{N=1} (NF_{input})^2 \qquad \text{Numeral expression 7}$$

$$P_{out} = \sum_{N=1} (NF_{output})^2 \qquad \text{Numeral expression 8}$$

The main control circuit 10 calculates the square sum $P_{in}$ of the input signal and the square sum $P_{out}$ of the output signal until the number of times of calculation N reaches a predetermined number, and compares a ratio between them to a threshold value, thereby confirms whether the resonance disturbance component can be suppressed.

When it is confirmed from such confirmation that the ratio in square sum is below the threshold value, and therefore the resonance disturbance component can be suppressed (S63: YES), processing is finished.

Figure 10:
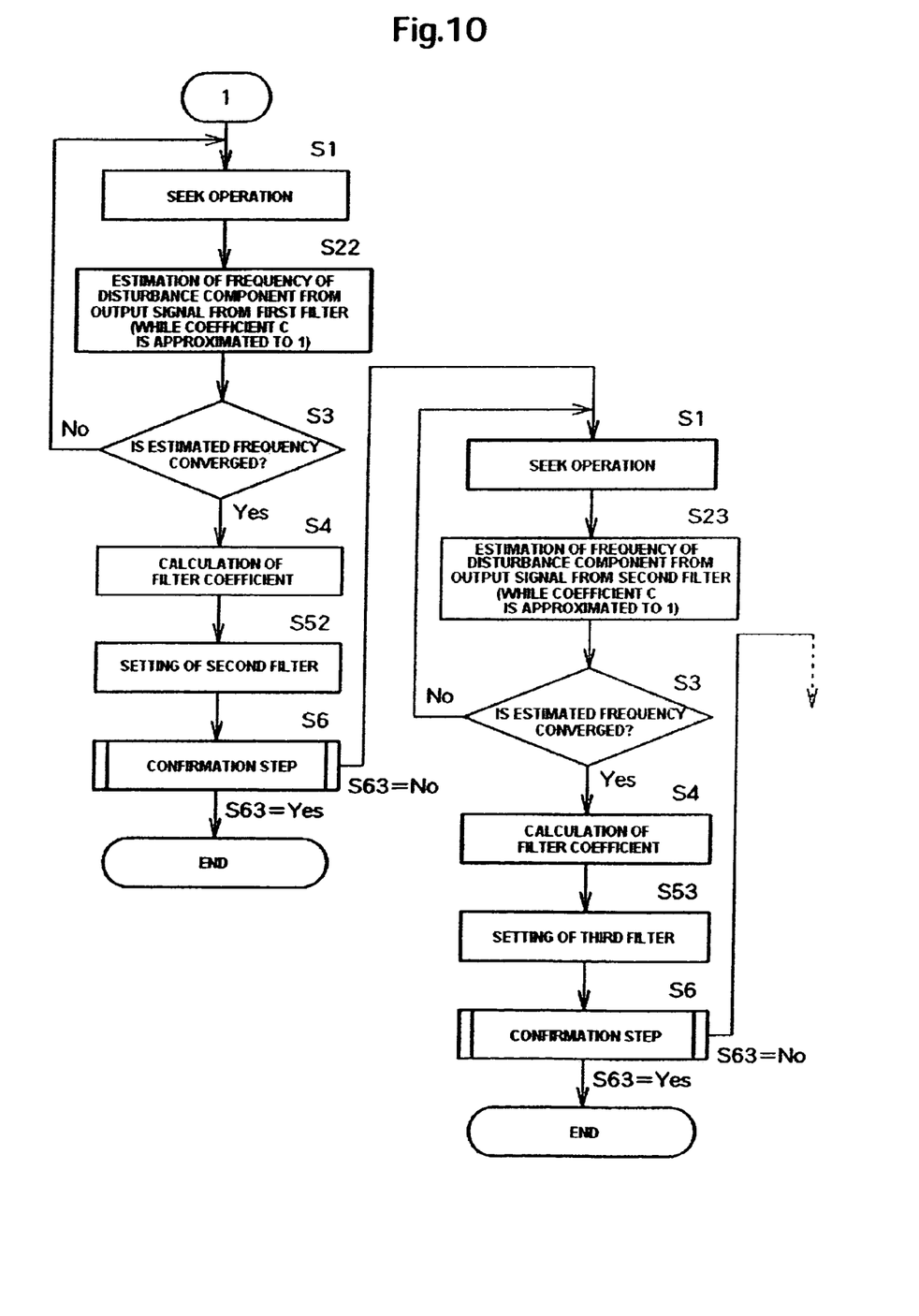
FIG. 10 shows a flow chart showing an operation example after the confirmation step of FIG. 9.

On the other hand, when the ratio in square sum is above the threshold value, and therefore the resonance disturbance component cannot be suppressed (S63:NO), processing is shifted to an operation example shown in FIG. 10. In the operation example shown in FIG. 10, a new notch filter (not shown) is set for suppressing a resonance disturbance component remained in the output signal from the notch filter 53.

First, the main control circuit 10 permits seek operation of the magnetic head 4 in the head moving step (S1) so that a resonance disturbance component appears in the output signal from the notch filter 53 (first notch filter) set in the step S5.

Next, the main control circuit 10 estimates a frequency of the resonance disturbance component contained in the output signal from the notch filter 53 after the seek operation of the magnetic head 4 in accordance with the same processing as in the step S2 (S22). Then, the main control circuit 10 calculates filter coefficients based on an obtained, estimated frequency f (S4), and sets the calculated filter coefficients to a new notch filter (second notch filter) in accordance with the same processing as in the step S5 (S52).

The new notch filter set in this way is provided at a downstream side of the notch filter 53 (between the notch filter 53 and the rotational vibration compensator 55 in FIG. 2), and suppresses the resonance disturbance component remained in the output signal from the notch filter 53.

Next, the main control circuit 10 performs confirmation step (S6) to confirm whether a resonance disturbance component contained in an output signal from the new notch filter being set with the filter coefficients is suppressed, and when the resonance disturbance component is suppressed (S63: YES), the main control circuit finishes processing. On the other hand, when the resonance disturbance component is remained in the output signal from the new notch filter (S63: NO), the main control circuit repeats the same processing as the previous processing until the resonance disturbance components are completely suppressed.

According to the above processing, even if a plurality of resonance disturbance components are contained in an output signal from the rotational vibration detector 30, the resonance disturbance components can be completely suppressed.

What is claimed is:

1. A method of controlling a magnetic disk drive comprising a magnetic disk, a magnetic head, a support mechanism that supports the magnetic head on the magnetic disk and is rotatable about a rotation axis fixed outside the magnetic disk, a head actuator that rotatably drives the support mechanism to move the magnetic head in an approximately radial direction of the magnetic disk, and a rotational vibration detector that detects rotational vibration of a drive housing about the rotation axis, wherein an output signal from the rotational vibration detector is used for controlling the head actuator, wherein the method comprises:
    a head moving step of driving the head actuator to move the magnetic head on the magnetic disk,
    a frequency estimation step of estimating a frequency of each disturbance component contained in the output signal from the rotational vibration detector after moving the magnetic head,
    a convergence determination step of determining the convergence of the estimated frequency, and
    a suppressor setting step of setting a disturbance suppressor for suppressing the disturbance component based on the estimated frequency.

2. The method of controlling a magnetic disk drive according to claim 1, characterized in that:
    the convergence determination step of determining the convergence of the estimated frequency includes performing calculation of an absolute value of dB and comparing the absolute value of dB to a threshold value.

3. The method of controlling a magnetic disk drive according to claim 1, characterized in that:
the disturbance suppressor is configured by a digital filter, and
the suppressor setting step includes setting a parameter included in a transfer function of the digital filter according to the estimated frequency.

4. The method of controlling a magnetic disk drive according to claim 3, characterized in that:
the parameter is determined for each frequency such that the digital filter suppresses a signal component in a predetermined frequency band including the relevant frequency.

5. The method of controlling a magnetic disk drive according to claim 1, characterized in that:
the frequency estimation step includes changing a mode between a mode where an estimated value is approximated to a frequency of a relatively large disturbance component in the disturbance components contained in the output signal from the rotational vibration detector, and a mode where the estimated value is allowed to match with the frequency of the relevant large disturbance component.

6. The method of controlling a magnetic disk drive according to claim 1, characterized in that:
the head moving step is repeated until the frequency of the disturbance component is estimated in the frequency estimation step.

7. The method of controlling a magnetic disk drive according to claim 1, characterized in that:
when the output signal from the rotational vibration detector contains a plurality of disturbance components being different in frequency, aiming at the output signal from the rotational vibration detector, the head moving step, the frequency estimation step, and the suppressor setting step are performed, so that a first disturbance suppressor is set so as to suppress a first disturbance component, and then
aiming at an output signal from the first disturbance suppressor, the head moving step, the frequency estimation step, and the suppressor setting step are performed, so that a second disturbance suppressor is set so as to suppress a second disturbance component.

8. The method of controlling a magnetic disk drive according to claim 1, characterized in that:
the rotational vibration detector is installed on the device housing, or a substrate attached to the device housing.

9. A magnetic disk drive, comprising:
a magnetic disk,
a magnetic head,
a support mechanism that supports the magnetic head on the magnetic disk, and is rotatable about a rotation axis fixed outside the magnetic disk,
a head actuator that rotatably drives the support mechanism to move the magnetic head in an approximately radial direction of the magnetic disk,
a rotational vibration detector that detects rotational vibration of a drive housing about the rotation axis,
an apparatus configured to drive the head actuator to move the magnetic head on the magnetic disk,
an apparatus configured to estimate a frequency of each disturbance component contained in an output signal from the rotational vibration detector after moving the magnetic head, and
an apparatus configured to set a disturbance suppressor for suppressing the disturbance component based on the estimated frequency;
wherein an output signal from the disturbance suppressor is used for controlling the head actuator;
wherein the apparatus configured to estimate a frequency of each disturbance component compares an absolute value of dB to a threshold value, and thereby determines whether the estimated frequency is converged or not.

10. The magnetic disk drive according to claim 9, characterized in that:
the disturbance suppressor is configured by a digital filter, and
the apparatus configured to set a disturbance suppressor is configured to set a parameter included in a transfer function of the digital filter according to the estimated frequency.

11. The magnetic disk drive according to claim 10, characterized in that:
the parameter is determined for each frequency such that the digital filter suppresses a signal component in a predetermined frequency band including the relevant frequency.

12. The magnetic disk drive according to claim 9, characterized in that:
the apparatus configured to estimate the frequency is configured to change a mode between a mode where an estimated value is approximated to a frequency of a relatively large disturbance component in the disturbance components contained in the output signal from the rotational vibration detector, and a mode where the estimated value is allowed to match with the frequency of the relevant large disturbance component.

13. The magnetic disk drive according to claim 9, characterized in that:
apparatus configured to move the head is configured to repeat movement until the frequency of the disturbance component is estimated in the frequency estimation step.

14. The magnetic disk drive according to claim 9, characterized in that:
the rotational vibration detector is installed on the device housing, or on a substrate attached to the device housing.

* * * * *